United States Patent [19]
Yellin et al.

[11] Patent Number: 5,946,489
[45] Date of Patent: Aug. 31, 1999

[54] APPARATUS AND METHOD FOR CROSS-COMPILING SOURCE CODE

[75] Inventors: Frank Yellin, Redwood City; Dean R. E. Long, Boulder Creek; Richard D. Tuck, San Francisco, all of Calif.

[73] Assignee: Sun Microsystems, Inc., Palo Alto, Calif.

[21] Appl. No.: 08/989,848

[22] Filed: Dec. 12, 1997

[51] Int. Cl.$^6$ .................................................. G06F 9/445
[52] U.S. Cl. .................. 395/705; 395/705; 395/704; 395/706; 395/709
[58] Field of Search .................................. 395/704, 705, 395/706, 707, 708, 709, 710, 712

[56] References Cited

U.S. PATENT DOCUMENTS

| | | | |
|---|---|---|---|
| 4,558,413 | 12/1985 | Schmidt et al. | 707/203 |
| 4,667,290 | 5/1987 | Goss et al. | 364/300 |
| 5,511,167 | 4/1996 | Kawano et al. | 395/200.32 |
| 5,768,593 | 6/1998 | Walters et al. | 395/705 |
| 5,778,233 | 7/1998 | Besaw et al. | 395/709 |
| 5,857,093 | 1/1999 | Bradford | 395/500 |

OTHER PUBLICATIONS

Aho et al., "Compilers Principles, Techniques, and Tools", Addison–Wesley Publishing, pp. 723–732, Mar. 1988.
Perugini, "A Flexible Approach To Test Program Cross Compilers", IEEE, pp. 1079–1086, 1991.
Moon et al., "SPARC–based VLIW testbed", IEE Proc-–Comput. Digit. Tech., pp. 215–224, May 1998.
Chen et al., "Experiences in Developing an Ada Cross Compiler", ACM, pp. 54–62, 1991.

*Primary Examiner*—Tariq R. Hafiz
*Assistant Examiner*—Ted T. Vo
*Attorney, Agent, or Firm*—William S. Galliani; Pennie & Edmonds LLP

[57] ABSTRACT

A method of cross-compiling computer programs includes the step of extracting constants from an inheriting computer program written in a first computer language. The extracted constants refer to a generating computer program written in a second computer language. A new program in the second computer language is then created using the constants. The new program is then compiled for a target computer to ascertain compiled constant values. The compiled constant values are then substituted into the inheriting computer program to produce a final inheriting computer program.

15 Claims, 5 Drawing Sheets

APPARATUS AND METHOD FOR CROSS-COMPILING SOURCE CODE

BRIEF DESCRIPTION OF THE INVENTION

This invention relates generally to software system management tools. More particularly, this invention relates to a software system management tool that is used to combine different source code programs written in multiple computer languages into a single program.

BACKGROUND OF THE INVENTION

Software system management tools define software modules, their interdependencies, and the rules that are required to combine the software modules into a final software program. Software system management tools are necessary in view of the fact that a large software program typically includes a large number of individual software modules in the form of source code programs that are compiled and then linked into a single executable final software program. The large number of individual software modules and their individual processing requirements result in the need for sophisticated software system management tools. For example, each source code program may require a distinct compiler. Thus, a mechanism must be developed to coordinate a source code program with the appropriate compiler. There are many commercially available software system management tools.

Software system management tools often combine computer code written in one language with computer code written in a second language. It is often necessary for the code written in one language (referred to herein as the inheriting language) to make use of constants and data structures defined by code written in a second language (referred to herein as the generating language). In addition, the values of these constants and the exact layout of these data structures often depend on the target machine for which the code is being compiled. The layout of the data structures and the value of the constants may be different between the machine doing the compiling (the host computer), and the machines for which the code is being compiled (the target computer). In some cases, the code may need to be compiled for multiple target machines that have different values and layouts.

The layout of these data structures and the value of the constants may change during the development process. It is important that it be easy to recompile the code written in the inheriting language. However, the specific constants and data structures referenced by the inheriting code are liable to change as the inheriting code is developed. In addition, new constants can be accessed and new fields in data structures might be accessed.

It would be highly desirable to provide a software system management tool that allows an inheriting language to make use of information from a generating language, regardless of the host computer or of the target computer. That is, the software system management tool should provide an automatic technique for determining the constants and fields needed by the inheriting code. Further, the software system management tool should make it easy to recompile the inheriting code automatically. Such a software system management tool would simplify the development of source code written in different languages.

SUMMARY OF THE INVENTION

A method of cross-compiling computer programs includes the step of extracting constants from an inheriting computer program written in a first (inheriting) computer language. The extracted constants refer to a generating computer program written in a second (generating) computer language. A new program in the second computer language is then created using the constants. The new program is then compiled for a target computer to ascertain compiled constant values. The compiled constant values are then substituted into the inheriting computer program to produce a final inheriting computer program.

The invention provides a software system management tool that allows an inheriting computer program to make use of information from a generating computer program, regardless of the computer on which the compilation will take place or of the target computer. That is, the cross-compiler of the invention provides an automatic technique for determining the constants and fields needed by the inheriting computer program. Further, the cross-compiler facilitates automatic recompilation of the inheriting computer program. The technique of the invention efficiently compiles source code written in different languages.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
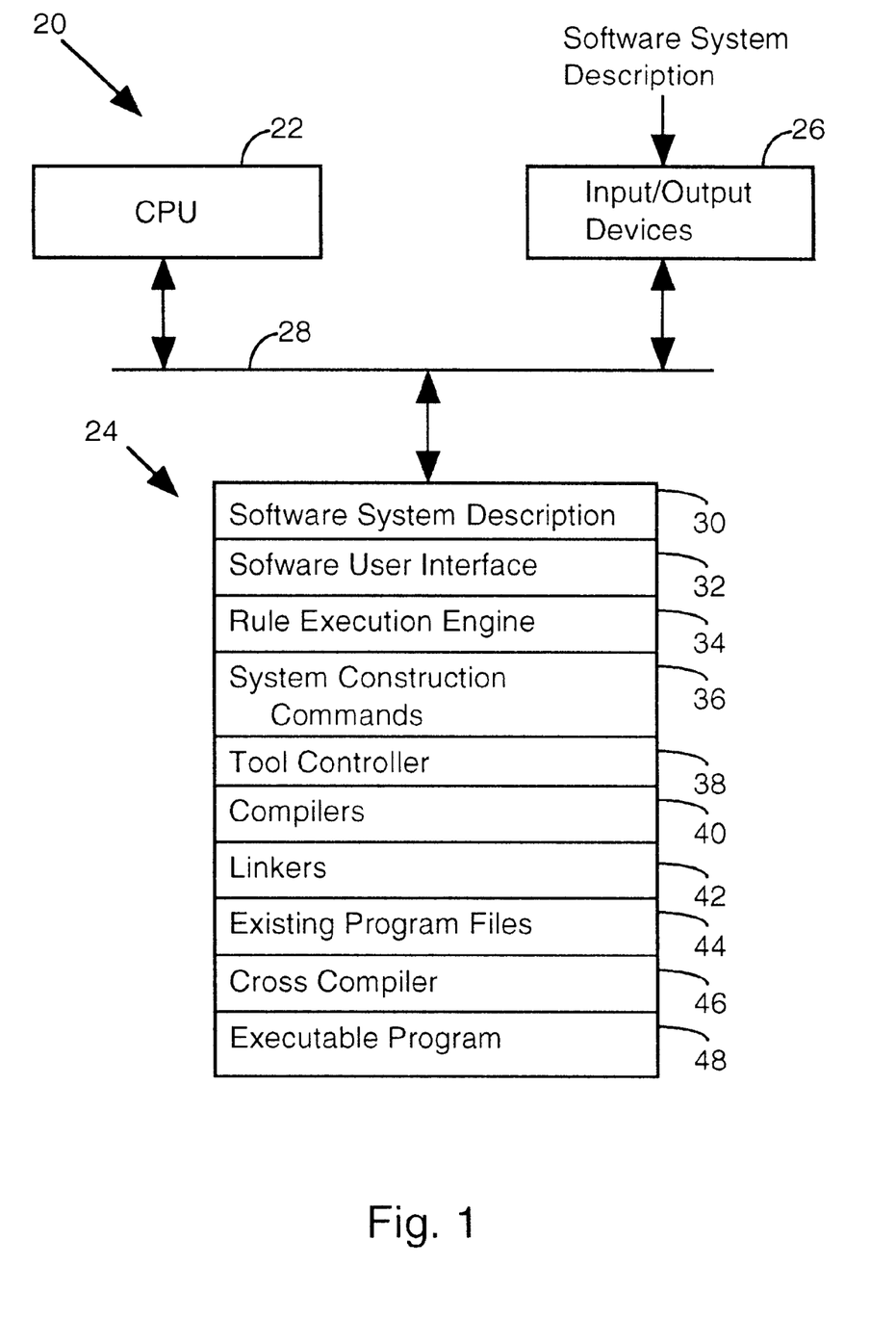
FIG. 1 illustrates a software system management apparatus in accordance with an embodiment of the invention.

FIG. 1 illustrates a software system management apparatus 20. The apparatus 20 includes processor 22 which communicates with a memory module 24 and a set of input/output devices (e.g., keyboard, mouse, monitor, printer, etc.) 26 through a bus 28. An individual working at the input/output devices 26 inputs a software system description, which is down-loaded into a memory module 24. The software system description 30 is an integrated description of software modules, their interdependencies, and the rules that are used to construct an executable program.

The memory module 24 stores a number of executable programs including a software user interface 32 (such as a graphical user interface) and a rule execution engine 34, which produces system construction commands 36. The executable programs stored in the memory module 24 also include a tool controller 38, compilers 40, linkers 42, and a cross compiler 46. The tool controller 38 receives the system construction commands 36 and existing program files 44. The tool controller 38 operates in conjunction with the compilers 40, linkers 42, and cross compiler 46 to execute the system construction commands 36 on the existing program files 44 to yield an executable program 48.

Figure 2:
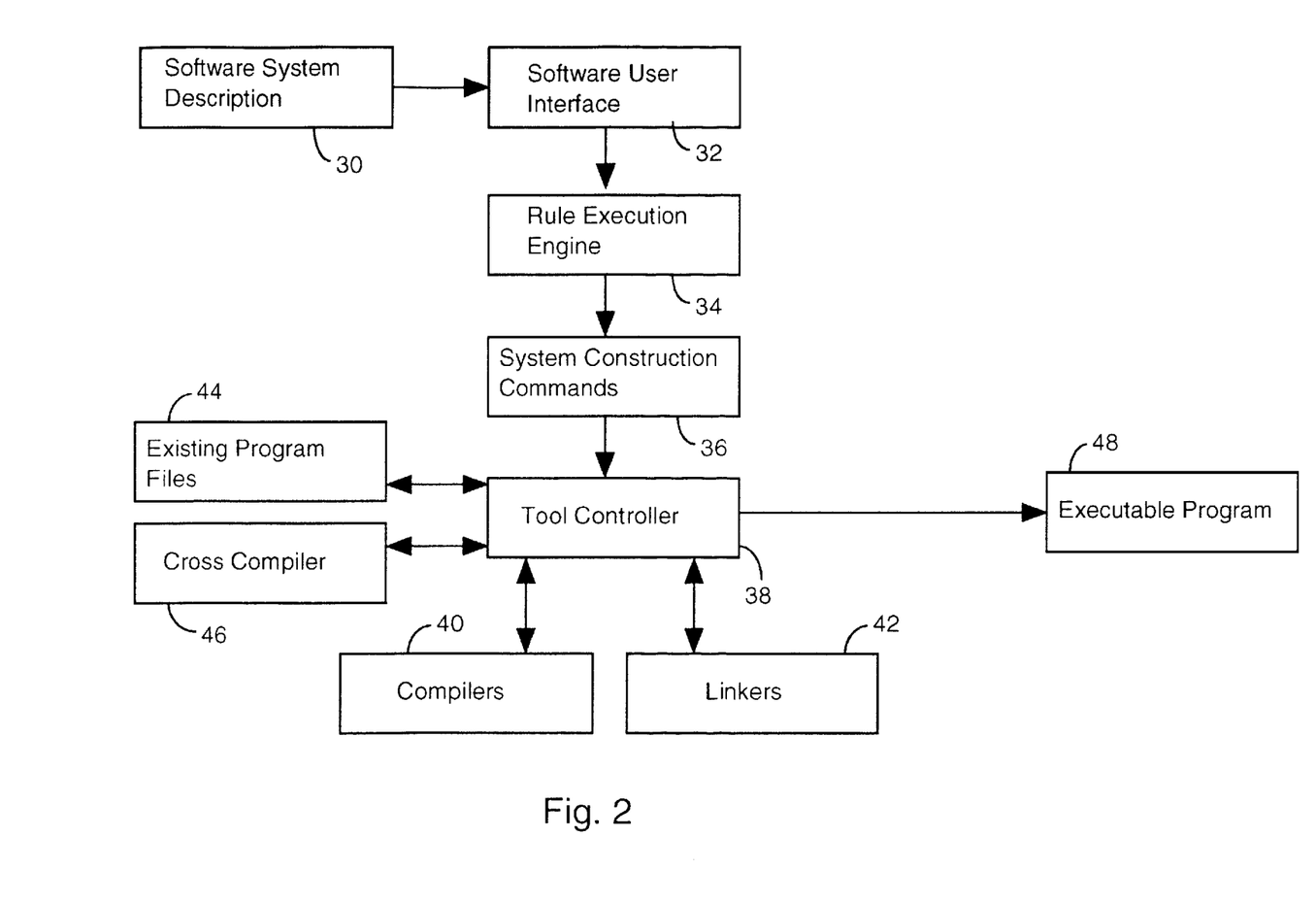
FIG. 2 illustrates processing operations associated with the software system management apparatus of FIG. 1.

The processing associated with this software system management apparatus 20 is more fully appreciated with reference to FIG. 2. The input data to the apparatus is a software system description specifying a set of software source code modules, their interdependencies, and the rules that are required to combine the software modules into a final software program. The software user interface 32 receives this information and passes it to a rule execution engine 34, which produces a set of system construction commands 36. For instance, if the rule-based software configuration description 30 specifies that files A, B, and C are to be combined to form file D, then the system construction commands 36 would constitute a set of commands that could be executed by the tool controller 38 to compile and link existing files A, B, and C to form file D.

Thus, the tool controller 38 executes the system construction commands 36 by interacting with the compilers 40, linkers 42, existing program files 44, and a cross compiler 46. After the tool controller 38 has executed the system construction commands 36, an executable program 48 is produced.

The present invention is directed toward the operation of the cross compiler 46. The other tools with which it operates (e.g., the other elements of FIG. 2) are generally known in the art.

The cross compiler 46 interacts with the tool controller 38 to execute system construction commands 36. More particularly, the cross compiler 46 interprets the system construction commands 36 to identify when two existing program files written in different languages are to be compiled into a single program. That is, the cross compiler 46 identifies when an existing program file written in a generating language is to be combined with an existing program file written in an inheriting language. The cross compiler 46 allows the inheriting language to make use of information from the generating language. That is, the cross compiler 46 provides an automatic technique for determining the constants and fields needed by the inheriting code, regardless of the target machine on which the program will be compiled. The cross compiler 46 does this in such a manner that it is still easy to automatically recompile the inheriting code. In sum, the cross compiler 46 facilitates the compilation of source code written in different languages. As a result, the other software system management tools of FIG. 2 operate more efficiently to produce an executable program 48.

Figure 3:
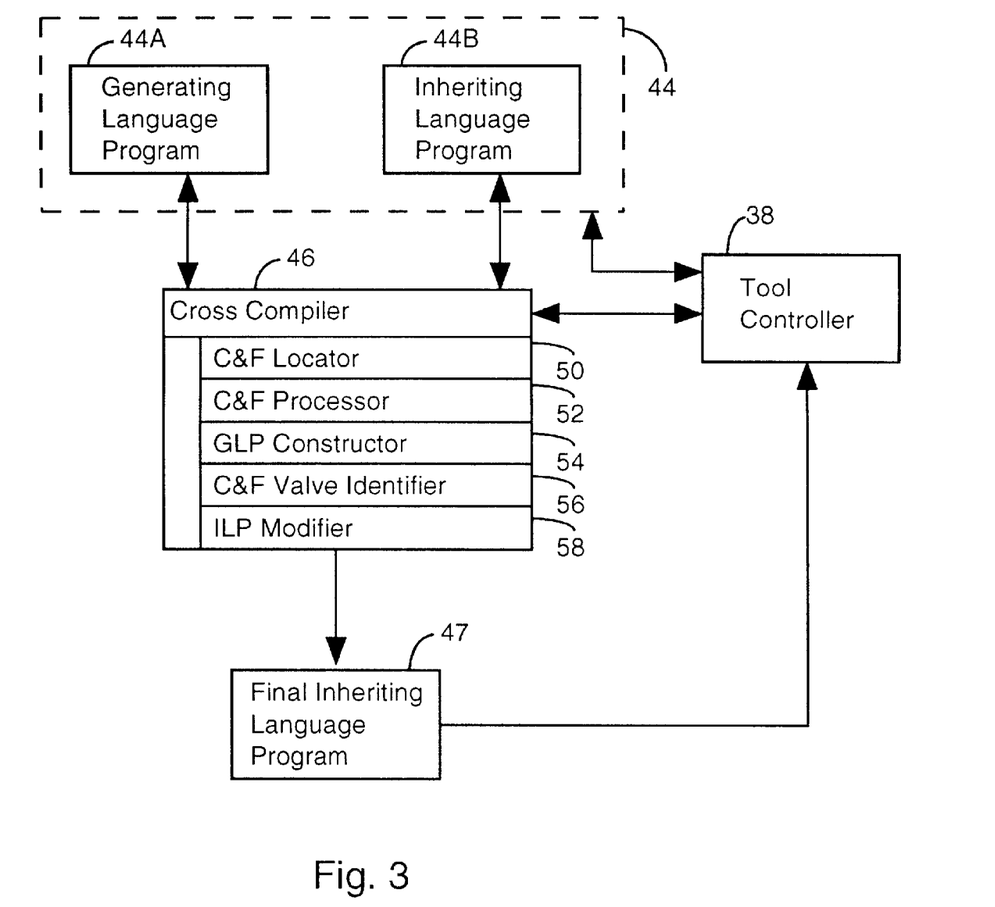
FIG. 3 is a more detailed depiction of the operation of the cross compiler of FIG. 2.

This operation is more fully appreciated with reference to FIG. 3. The cross compiler 46 processes commands from the tool controller 38 by accessing a generating language program 44A and an inheriting language program 44B of the existing program files 44. In particular, a constants and fields locator software module 50 identifies in the inheriting language program 44B references to the generating language program 44A. A constants and fields processor module 52 then extracts the constants and fields and preferably removes duplicate references, thereby producing a constants and fields file. A generating language program constructor module 54 then uses the constants and fields file to create a new and stylized generating language program. A constants and fields value identifier module 56 identifies compiled constant and field values in cross compiled code corresponding to the new generating language program. An inheriting language program modifier module 58 is then used to substitute the compiled constants and field parameters into the inheriting language program. This results in a final inheriting language program 47, which uses the constants and fields from the generating language program 44A. The tool controller 38 may then use the final inheriting language program 47 in connection with the compilers 40 and linkers 42 to produce an executable program 48.

Figure 4:
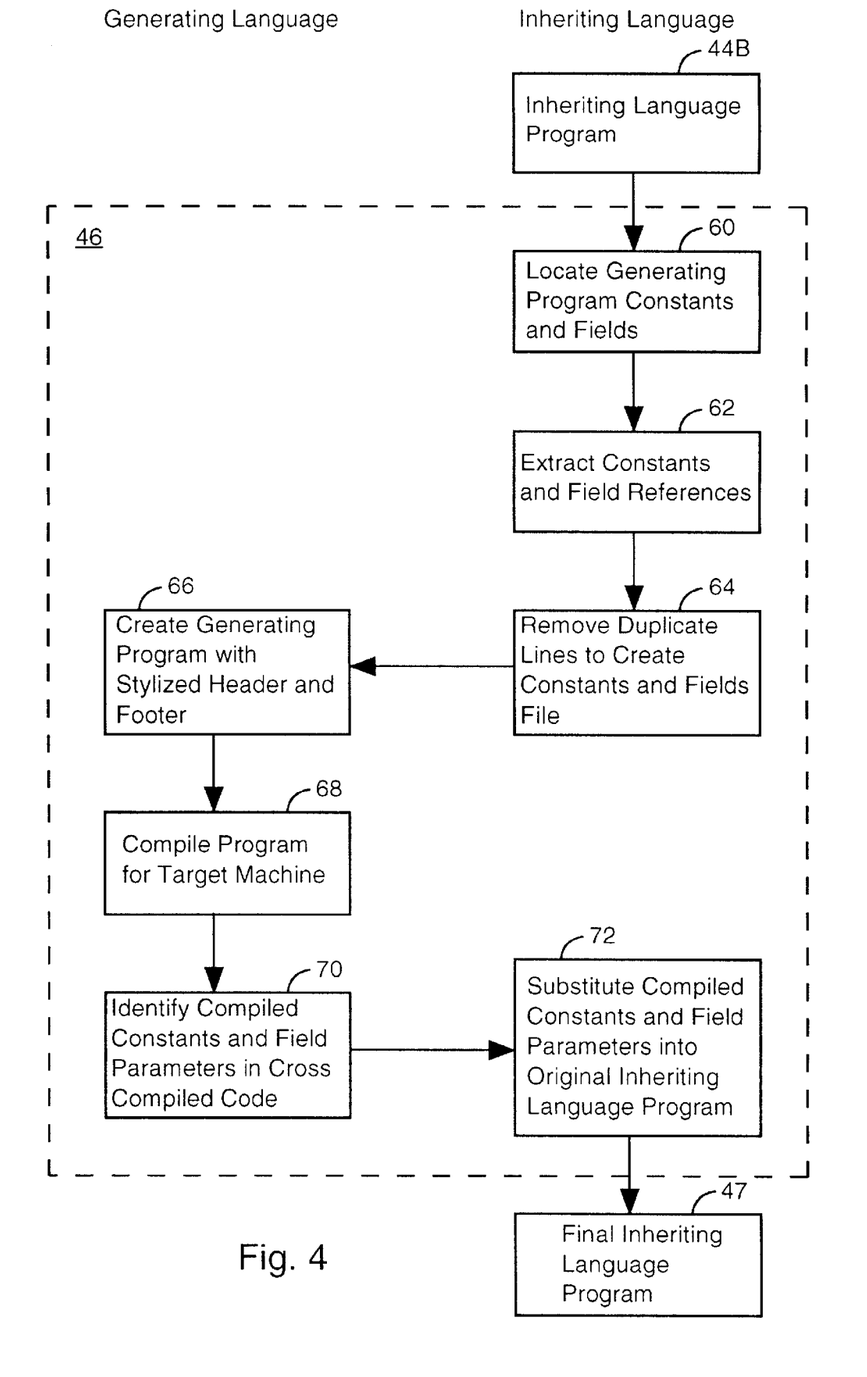
FIG. 4 illustrates processing steps associated with an embodiment of a cross compiler constructed in accordance with the invention.

The particular steps executed by an embodiment of the cross compiler 46 of the invention are illustrated in FIG. 4. FIG. 4 illustrates the cross compiler 46 of the invention receiving an inheriting language program 44B and generating a final inheriting language program 47, consistent with the description of FIG. 3.

The first processing step for the cross compiler 46 of FIG. 4 is to modify the inheriting language program to identify references to the generating language program (step 60). This operation may be performed by the constants and fields locator module 50. The references to the generating language program are in the form of constants and fields. Modifications to the constants and fields, discussed below, makes them implementation independent.

The next processing step executed by the cross compiler 46 is to extract the identified constants and fields (step 62). Thereafter, duplicate lines containing the identified constants and fields are preferably removed to create a constants and fields file (step 64). These operations may be performed with the constants and fields processor module 52.

As shown in FIG. 4, all of the processing up to this point has been directed toward the inheriting language. The next processing step is to create, from the constants and fields file written in the inheriting language, a corresponding generating language program with a stylized header and footer (step 66). This operation entails converting each line from the constants and fields file of step 64 into a macro, as discussed below. This operation may be performed by the generating language program constructor 54.

The program is then compiled for a target machine or machines (step 68). This aspect of the invention provides cross compiled code for multiple target machines. Observe that the cross compiled code only relates to the constants and fields of the original inheriting language program 44B. Thus, when changes are made to the original inheriting language program 44B, it is relatively efficient to recompile the code in accordance with the invention. That is, the entire inheriting language program 44B need not be recompiled, rather only the constants and fields file needs to be recompiled.

The next processing step is to identify compiled constants and field parameters in the code (step 70). This operation may be performed with the constants and fields value identifier 56. The identified compiled constants and field parameters are then combined with the original inheriting language program (step 72) to yield the final inheriting language program 47. This step may be performed with the inheriting language program modifier module 58.

While prior art techniques exist for automatically generating "constants files" for specific constants and field offsets, those skilled in the art will recognize that the present invention expands beyond such rudimentary implementations because it operates in an environment where compilation is for machines other than the machine on which the compilation is being performed. In accordance with the invention, the inheriting language code is automatically rewritten with correct constants and field offsets for the target machine.

The features and benefits of the invention are more fully appreciated with reference to a more specific example. The invention is disclosed through an example wherein the generating language is "C" and the inheriting language is SPARC Assembler. However, those skilled in the art will appreciate that the techniques of the invention can be used for any inheriting and generating languages.

In accordance with an embodiment of the invention, the software system description 30 includes a MAKE file with the following lines.

```
(1) $(OBJDIR)/
        make_struct_offsets.s:
        extract_offsets.nawk opcodes.wide opcodes.h
(2) $(OBJDIR)/make_struct_offsets.s: executeJava_sparc.m4.s
(3)     $(M4) —DJAVAOS -DEXTRACT_OFFSETS
        $< | sort -u | nawk -f
        extract_offsets.nawk > $(OBJDIR)/make_struct_offsets.c
(4)     $(CC) $(CFLAGS) $(INCLUDES) -S $(OBJDIR)/
        make_struct_offsets.c -o
        $@
```

The foregoing and following computer code of this patent document contains material which is subject to copyright protection. The copyright owner has no objection to the facsimile reproduction of the computer code, as it appears in the Patent and Trademark Office files or records, but otherwise reserves all rights established under applicable copyright laws.

Lines (1) and (2) of the code indicate that if any of the four files (1) "extract_offsets.nawk", (2) "opcodes.wide", (3) "opcodes.h", or (4) "executeJava_sparc.m4.s" change, then line (3) should be executed. In other words, the software system description 30 will result in system construction commands 36 that are processed by the tool controller 38. If the tool controller 38 identifies that any of the four files have changed, it will invoke the cross compiler 46.

The file "extract_offsets.nawk" contains portions of the cross compiler 46 of the invention. In particular, it contains instructions to implement steps 62 and 66 of FIG. 4. If this file changes, then the result should be re-computed. If the files "opcodes.wide" or "opcodes.h" have changed, then it's possible that some of the constants have changed value. Any change to the file "executeJava_sparc.m4.s" means that there may be new constants or field offsets of interest or that some previously interesting constants or field offsets are no longer important.

If one of the four enumerated files has changed, the following code is executed:

```
m4-DJAVAOS-DEXTRACT_OFFSETS executeJava_sparc.m4.s |
    sort-u |
    nawk-f extract_offsets.nawk > $(OBJDIR)/make_struct_offsets.c
cc <various flags>-S $(OBJDIR)/make_struct_offsets.c-o $@
```

This code corresponds to the operations performed by the cross compiler 46. The code causes "executeJava_sparc.m4.s" to run through processor m4 with the two flags JAVAOS and EXTRACT_OFFSETS set to 1. This causes the processor m4 to modify the inheriting language program to identify generating program references (step 60). Thus, the processor m4 can be thought of as the constants and fields locator module 50. For example, all references to constants are written as "DEFINED_CONSTANT (<constant>)". Further, all references and updates to fields are written in such a way that it is unnecessary to know the size, signedness, or offset of the particular field in the record. For example, each "GET_FIELD (<reg>, <structure>, <field>, <result>)" term is converted into a line of the form LOAD_STORE <structure> <field>.

These operations are implemented as follows. The file executeJava_sparc.m4.s is written in a highly stylized format, suitable for m4. The first line of the file is "ifdef ('EXTRACT_OFFSETS', 'divert(-1)')", which says that if the flag EXTRACT_OFFSETS is defined, then throw out all input unless otherwise instructed. Later in the file, there are m4 directives such that if EXTRACT_OFFSETS is defined, the entire contents of the file are ignored except for occurrences of DEFINED_CONSTANT(<baz>), EXTRACT_OFFSET (<mystruct>,<myfield>), GET_FIELD(<base>,<mystruct>,<myfield>,<reg>), and SET_FIELD(<value>,<base>,<mystruct>,<myfield>), where each of the lower-case strings is, in fact, a text string.

Each occurrence of DEFINED_CONSTANT(<baz>) is output as "CONST <baz>". Each occurrence of EXTRACT_OFFSET(<mystruct>,<myfield>) is output as "FIELD<mystruct>,<myfield>". Each occurrence of GET_FIELD(<base>, <mystruct>,<myfield>,<reg>) and SET_FIELD(<value>,<base>,<mystruct>, <myfield>) is output as "LDST <mystruct>,<myfield>".

The code in the file is written such that it makes use of these macros. For example, If reg1 contains a pointer to a methodblock structure, and its ClassClass field is required, GET_FIELD(reg 1, methodblock, ClassClass, reg2) is written. If reg3 is to be compared to the constant "opc_wide", "cmp reg3, DEFINED_CONSTANT (opc_wide)"is written. In particular, all references to constants are wrapped inside DEFINED_CONSTANT(..). To extract the field from a pointer, the GET_FIELD instruction is used. To set the field of a pointer, the SET_FIELD instruction is used. To get a pointer to the field of a pointer, "STRUCTURE_OFFSET (..)" is added to the pointer.

The foregoing processing associated with steps 60 and 62 results in a line for each reference to a constant and a line for each reference to a field. If there are multiple references to a field, each of those references will generate a separate line. It is easier, although not necessary, to process each defined constant and each field only once. Thus, preferably, duplicate lines are deleted to create a constants and fields file (step 64). This may be accomplished by passing the result through "sort -u", a standard utility, which sorts lines and deletes duplicate lines. The sorting of lines is an artifact of the "sort" utility and therefore is unimportant.

A new generating language program with a stylized header and footer is then created (step 66). Each line is associated with a macro call, which is defined in the header. For example, the line LOAD_STORE<structure><field> becomes LOAD_STORE (<structure>, <field>). The specific header and trailer information and the exact code generated for each line is dependent on the generating language.

This operation is more fully appreciated with the following example. The constants and fields file created by step 64 is processed by a text processor called "nawk". The program that the text processor runs is contained in the file "extract_offsets.nawk". The "nawk" program generates a C program (a generating language program) that has three parts. The first part is a stylized header, for example:

```
#include "oobj.h"
#include "interpreter.h"
#include "opcodes.h"
#include "tree.h"
#include "typecodes.h"
#include "stddef.h"
#define SHOWME(structure, name)\
```

```
{ struct structure *temp; \
    asm("SET_STRUCTURE_INFO('" #structure "','" #name
        "','%0','%1','%2')" \
    :: "n" (sizeof(temp -> name)), \
    "n" (offsetof(struct structure, name)), \
    "n" ((typeof(temp -> name))(~0) < 0)); \
}
#define FIELDOFF(structure, name) \
    asm("SET_FIELD_OFFSET('" #structure "',
        "' #name "','%0')" \
    :: "n" (offsetof(struct structure, name)) )
#define CONSTANT(name) asm("SET_VALUE('"#name"',
'%0')" :: "n"
                ((int)name) )
main(int argc, char ** argv){
asm("! File automatically generated by m4 and nawk" );
asm("! Do not bother editing this! Find the source!" );
```

The processing of this header information is discussed below. After this stylized header is created, the following transformations are made for the constants and fields: "CONST<baz>" is assigned to "CONSTANT(<baz>)", "LDST <struct><myfield>" is assigned to "SHOWME (<mystruct>,<myfield>)", and "FIELD <mystruct><myfield>" is assigned to "FIELDOFF (<mystruct>,<myfield>)". A final closing "}" is then appended as a footer. The result is a program "make_struct_offsets. c", which can be compiled by a C compiler. In other words, at this point, step 66 of FIG. 4 is completed. The next processing step is to compile the program for the target machine (step 68).

In accordance with the invention, the compiler is given specific switches to tell it to generate assembly language for the target machine, rather than to generate a binary file. In particular, the stylized generating language file from step 66 is specifically designed so that it generates highly stylized assembly-language code. The code may be stylized to the point that it cannot be actually assembled into machine code. All that is necessary is that the resulting assembly language code be machine-parseable so that one can determine (1) the value that the compiler gave to each constant and (2) the size (number of bytes), offset, and signedness of each of the fields.

The result of this step will always be assembly language, regardless of the inheriting language. It is coincidental that in the present example, that the original inheriting language is also assembly language.

At this point, the .s file has the following form for each of the SHOWME, CONSTANT, and FIELDOFF items, respectively: SET_STRUCTURE_INFO(<structure>,<field>, <size>,<offset>,<signedness>) SET_VALUE(<name>, <value>) SET_FIELD_OFFSET(<structure>,<field>, <offset>).

The process by which this transformation takes place is as follows. Because of the #define, each line of the form CONSTANT (<baz>) gets turned into:

```
"asm ( "SET_VALUE('" "baz" "','%0')" : : "n" ( ( int ) baz ) )".
```

Similarly, each line of the form FIELDOFF(mystruct, myfield) gets turned into:

```
"asm ( "SET_FIELD_OFFSET('" "mystruct" "','" "myfield" "',
'%0')" : : "n" (
offsetof( struct mystruct , myfield ) ) )"
```

Each line of the form SHOWME(mystruct,myfield) gets turned into:

```
"{ struct mystruct * temp ;
    asm ( "SET_STRUCTURE_INFO('" "mystruct"
"','"
    "myfield" "','%0','%1','%2')" : : "n" ( sizeof( temp -> myfield ) ) ,
    "n" ( offsetof( struct mystruct, myfield) ) ,
    "n" ( ( typeof( temp -> myfield
        ) ) ( ~ 0 ) < 0 ) ); }"
```

These instructions make use of the Gnu C-compiler (or other similar C compiler) facility for generating specific assembly language. However, since the compilation to assembly code is solely for the purpose of defining constants and field offsets, the inline assembly code that is generated does not have to be executable. In particular, the inline assembly code:

```
"asm ( "SET_VALUE('" "baz" "','%0')" : : "n" ( ( int ) baz ) )"
``` generates, in assembly language:

```
"SET_VALUE('baz','23')"
``` where 23, in this case happens to be the value of baz. The inline assembly code:

```
"asm ( "SET_FIELD_OFFSET('" "mystruct" "','" "myfield" "',
'%0')" : : "n" (
offsetof( struct mystruct , myfield )"
``` generates:

```
"SET_FIELD_OFFSET('mystruct','myfield','16')"
``` where 16, for example, is the offset of "myfield" in the "mystruct" structure. The inline assembly code:

```
"{ struct mystruct * temp ;
    asm ( "SET_STRUCTURE_INFO('" "mystruct"
"','"
    "myfield" "','%0','%1','%2')" : : "n" ( sizeof( temp -> myfield ) ) ,
    "n" ( offsetof( struct mystruct, myfield ) ) ,
    "n" ( ( typeof( temp -> myfield
        ) ) ( ~ 0 ) < 0 ) ) ; }"
``` turns into:

```
"SET_STRUCTURE_INFO('mystruct,'myfield','2','16','1')".
```

In this case, the 16 is again the offset of the field. The "2" indicates that this is a 2-byte quantity. The "1" indicates that this is a signed value (an unsigned value would assign a "0" to this field).

Observe that the s file generated will have additional information. It will specifically have the lines:

> "! File automatically generated by m4 and nawk"
> "! Do not bother editing this! Find the source!"

These lines are created by the asm declarations at the start of the main routine defined in step 66. The code will also include function prologues and other information.

If one intends to cross compile for a different platform, then the .c file is compiled into assembly for the target platform. The macros are written in such a way that all the constant values, field offsets, etc., are generated for the target machine.

The .s file is processed by extracting lines that contain the word SET. For example, one can create the file "executeJava_sparc.include" by extracting lines containing the word SET. This can be done using the UNIX command "grep", e.g., "grep SET extractoffsets.s executeJava_sparc.include".

The next processing step is to combine the compiled constants and field parameters with the original inheriting language program. That is, for each occurrence of DEFINED_CONSTANT(<name>), replace it with the exact value of the constant. For each occurrence of GET_FIELD(<reg>,<structure>,<field>,<result>) convert it into specific inheriting language instructions necessary to access the value. Thus, the final inheriting language program 47 is a combination of the original program text with the result of the processing of the cross compiler 46.

These operations can be performed as follows. Run "executeJava_sparc.m4" through the processor m4 a second time. However, this time the EXTRACT_OFFSET flag is not turned-on. This causes m4 macros called SET_FIELD_OFFSET, SET_STRUCTURE_INFO, and SET_VALUE to be defined. In addition, the previously created file "ExecuteJavaStructOffsets.include" is read in. Each line of the file is interpreted using the macro definitions defined in step 60. The remainder of the file "executeJava_sparc.m4" is handled normally by the processor m4. In particular, the four macros DEFINED_CONSTANT(baz)
EXTRACT_OFFSET(mystruct,myfield)
GET_FIELD(base,mystruct,myfield,reg)
SET_FIELD(value,base,mystruct,myfield)

have completely different meanings than they did in step 60.

For constants, SET_VALUE('name','value') is turned into define('name,value') and DEFINED_CONSTANT (name) is turned into "name". Hence, if one has SET_VALUE('baz',·23') from the include file, and the occurrence of DEFINED_CONSTANT(baz) somewhere in the text, the macro pre-processor will turn DEFINED_CONSTANT (baz) into baz and then that into 23.

For field offsets, SET_FIELD_OFFSET(struct,field, offset) is turned into the assembler directive: "struct.field=offset". Similarly, "STRUCT_OFFSET (struct,field)" is turned into "struct.field". The next effect is that every occurrence of "STRUCT_OFFSET(struct,field)" becomes "struct.offset", which the assembler can then replace with the correct value. For field accessors and setters, "SET_STRUCTURE_INFO('mystruct','myfield','4','16','1')" defines two macros: "GET_FIELD.mystruct.myfield(base, result)" and "SET_If one intends to cross compike for a different FIELD.mystruct. myfield(base, value)". The definition of:

> "GET_FIELD.mystruct.myfield(base, result)" is "ld.2.1 [base+16], value"
> "SET_FIELD.mystruct.myfield(base, value)" is "st.2.1 value, [base+16],"

where the "4", "16", and "1" are extracted from the fields. Separately, the opcodes st.1.0, st.1.1, st.2.0, st.2.1, st.4.0, st.4.1, 1d.1.0, 1d.1.1, 1d.2.0, 1d.2.1, 1d.4.0, 1d.4.1, are defined to be the appropriate opcodes for storing and loading the appropriately sized field of the appropriate sign. For example, on SPARC, "1d.2.1" is defined to be "ldsh" (load a signed half-word). Similarly, > GET_FIELD(base,mystruct,myfield, reg)
> SET_FIELD(value,base,mystruct,myfield)

would be defined to be

> GET_FIELD.mystruct.myfield(base,reg)
> SET_FIELD.mystruct.myfield(base,value)

respectively. Hence

> GET_FIELD(base,mystruct,myfield,reg)

turns into

> GET_FIELD.myfield.mystruct(base,reg)

which turns into

> ld.2.1 [base+16],reg which turns into

> ldsh [base+16], reg, which is the desired result of an inheriting language program instruction that has utilized information from a generating language program.

Figure 5:
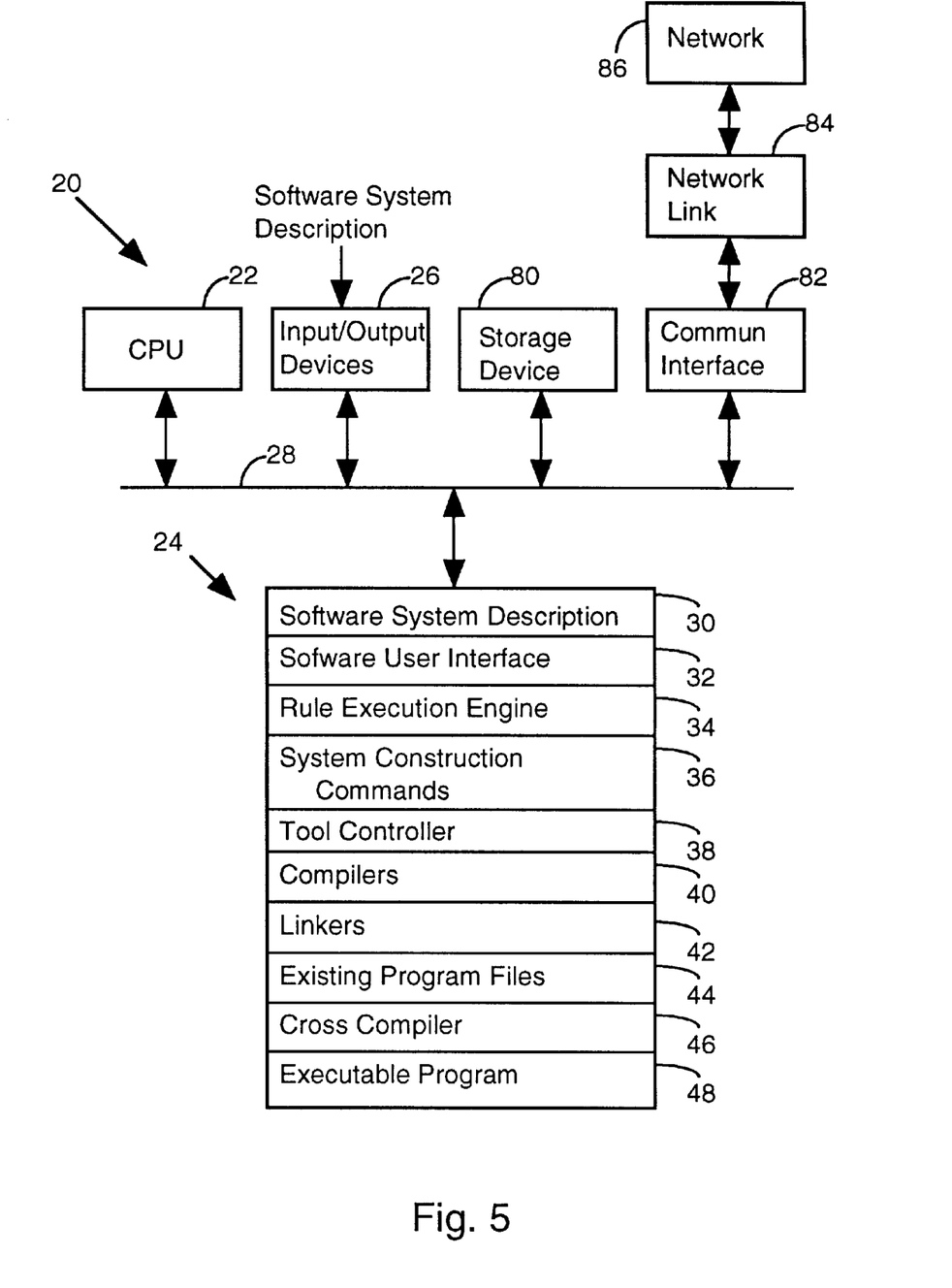
FIG. 5 illustrates a software system management apparatus in accordance with another embodiment of the invention.

FIG. 5 illustrates an alternate apparatus for practicing the invention. FIG. 5 corresponds to FIG. 1, but includes a storage device 80, a communications interface 82, a network link 84, and a network 86. The programs stored in the memory 24 may be downloaded from a computer-readable medium associated with the storage device 80, or alternately, may be executed from the computer-readable medium associated with the storage device 80. The term "computer-readable medium" refers to any medium that participates in providing instructions to the processor 22 for execution. Such a medium may take many forms, including but not limited to, non-volatile media, volatile media, and transmission media. Non-volatile media includes, for example, optical or magnetic disks, associated with the storage device 110. Volatile media includes dynamic memory. Transmission media includes coaxial cables, copper wire and fiber optics, including the wires that comprise bus 28. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described below, or any other medium from which a computer can read.

Various forms of computer readable media may be involved in carrying one or more sequences of one or more instructions to processor 22 for execution. For example, the instructions may initially be carried on a magnetic disk of a remote computer. The remote computer can load the instructions into its dynamic memory and send the instructions over a telephone line using a modem. A modem local to the computer system 20 can receive the data on the telephone line and use an infra-red transmitter to convert the data to an infra-red signal. An infra-red detector coupled to the bus 28 can receive the data carried in the infra-red signal and place the data on bus 28. The bus 28 then carries the data to the memory 24, from which the processor 22 retrieves and executes the instructions. The instructions received by the memory 24 may optionally be stored on the storage device 80 either before or after execution by the processor 22.

The computer system 20 also includes a communication interface 82 coupled to the bus 28. The communication interface 82 provides a two-way data communication coupled to a network link 84 that is connected to a network 86. For example, the communication interface 82 may be an integrated services digital network (ISDN) card or a modem to provide a data communication connection to a corresponding type of telephone line. As another example, the communication interface 82 may be a local area network (LAN) card to provide a data communication connection to a compatible LAN. Wireless links may also be implemented. In any such implementation, the communication interface 82 sends and receives electrical, electromagnetic or optical signals that carry digital data streams representing various types of information.

The network link 84 typically provides data communication through one or more networks, represented by the network 86. For example, the network link 84 may provide a connection to a network 88 that includes a host computer operated as an Internet Service Provider (ISP). The ISP in turn provides data communication services through the world wide packet data communication network now commonly referred to as the "Internet". The network 86 uses electrical, electromagnetic or optical signals that carry digital data streams. The signals through the various networks and the signals on the network link 84 and through the communication interface 82, which carry the digital data to and from the computer system 20, are exemplary forms of carrier waves transporting the information.

The computer system 20 can send messages and receive data, including program code, through the network 86, the network link 84, and the communication interface 82. In the Internet example, a server on the network 86 may transmit a requested code for an application program through the network 86, the network link 84, and the communication interface 82. The received code may be executed by the processor 22 as it is received and/or stored in the storage device 80, or other non-volatile storage for subsequent execution. In this manner, the computer system 20 may obtain application code in the form of a carrier wave.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

We claim:

1. A method of cross-compiling computer programs, said method comprising the steps of:

extracting constants from an inheriting computer program written in a first computer language that refer to a generating computer program written in a second computer language;

creating a new program in said second computer language using said constants;

compiling said new program for a target computer to ascertain compiled constant values; and substituting said compiled constant values into said inheriting computer program to produce a final inheriting computer program.

2. The method of claim 1 wherein said extracting step includes the step of extracting fields from said inheriting computer program.

3. The method of claim 2 further comprising the step of removing duplicate fields and constants.

4. The method of claim 2 wherein said creating step includes the step of creating a new program that is machine-parseable to determine the value of each of said constants and the attributes of each of said fields without assembling said new program into machine code.

5. The method of claim 1 wherein said compiling step includes the step of compiling said new program for a plurality of target computers.

6. A computer readable medium to direct a computer to function in a specified manner, comprising:

a first set of instructions to extract constants from an inheriting computer program written in a first computer language that refer to a generating computer program written in a second computer language;

a second set of instructions to create a new program in said second computer language using said constants;

a third set of instructions to compile said new program for a target computer to ascertain compiled constant values; and a fourth set of instructions to substitute said compiled constant values into said inheriting computer program to produce a final inheriting computer program.

7. The apparatus of claim 6 wherein said first set of instructions include instructions to extract fields from said inheriting computer program.

8. The apparatus of claim 7 wherein said first set of instructions include instructions to remove duplicate fields and constants.

9. The apparatus of claim 7 wherein said second set of instructions include instructions to create a new program that is machine-parseable to determine the value of each of said constants and the attributes of each of said fields without assembling said new program into machine code.

10. The apparatus of claim 6 wherein said third set of instructions include instructions to compile said new program for a plurality of target computers.

11. A computer readable medium to direct a computer to function in a specified manner, comprising:

a constants and fields locator module to identify in an inheriting computer program references to constants and fields associated with a generating computer program;

a generating language program constructor module to create a new generating language program incorporating said constants and fields;

a constants and fields value identifier module to identify compiled constants and fields in compiled code corresponding to said new generating language program; and an inheriting language program modifier module to substitute said compiled constants and fields into said inheriting language program to produce a final inheriting language program.

12. The apparatus of claim 11 wherein said constants and fields locator module removes duplicate fields and constants.

13. The apparatus of claim 11 wherein said generating language program constructor module creates a new program that is machine-parseable to determine the value of each of said constants and the attributes of each of said fields without assembling said new program into machine code.

14. The apparatus of claim 11 further comprising a tool controller, a compiler, and a linker.

15. The apparatus of claim 11 wherein said computer readable medium is a memory connected to a system bus of a general purpose computer.

* * * * *